Patented Jan. 5, 1937

2,066,892

UNITED STATES PATENT OFFICE 2,066,892

MANUFACTURE OF CITRIC ACID

Pietro Leone, Palermo, Italy, assignor to "Arenella" Societa Italiana per l'Industria dell' Acido Citrico ed Affini, Palermo, Italy No Drawing. Application July 28, 1933, Serial No. 682,627. In Italy July 29, 1932

4 Claims. (Cl. 260—112)

In the manufacture of citric acid of any origin whatsoever and particularly from the juice of citrus fruits, the most important problem is that of the separation of the acid from the impurities contained in the liquid (sugars, colloids, pectic and nitrogenous substances, salts and organic acids other than citric etc.) all of which impede the crystallization of the citric acid.

Such separation is now usually obtained by precipitating the citric acid in the form of salt of calcium; subsequently decomposing this latter with sulphuric acid and subjecting the citric solution obtained to repeated crystallizations and purifications.

Instead of precipitating the citric acid, it has been attempted to precipitate or to suitably divert the colloidal substances according to several attempts in this direction, in order to transform the original juice into a solution which can easily be crystallized directly.

However, both processes just mentioned have in common a very formidable disadvantage, namely, that both the solution of citric acid obtained by the decomposition of citrate of lime and the citric liquids which are suitably freed from the colloidal substances permit crystallization of the acid in a considerably impure state, and after repeated concentrations of only a part of the citric acid content, while at a certain point the accumulation of the impurities in the mother liquor ultimately renders the remaining citric acid absolutely uncrystallizable. It follows that the crystals of citric acid must be purified by successive solutions and re-crystallizations and that the mother liquor must again be treated with lime in order to re-precipitate the considerable quantities of citric acid which it still contains, in the form of citrate of lime, which has to be treated as outline above.

This latter is quantitatively about the same in the two cases above mentioned and cannot be neglected, the citric acid therein present having to be precipitated in the form of salt of calcium.

There is consequently always a portion of acid which precipitates as citrate at least twice in the case of the process first mentioned or calcium citrate process, and at least once during the process by direct crystallization.

The necessity of thus having to revert to the initial stage owing to the impurities present, is strong evidence of the incomplete purification both in the calcium citrate process and in the process depending on the colloidal purification. On the other hand the precipitation of the citrate from the mother liquor in normal conditions has the deleterious effect of returning continuously in the cycle a portion of the various impurit' instead of eliminating them completely. That inconvenience, together with the necessity of purifying, by recrystallization of the impure crystals obtained, are a cause of high operation costs.

Experiments carried out by the applicant in connection with both processes above referred to, and with the nature of the impurities which in both of said cases cause an incomplete crystallization of citric acid, have enabled him to work out a new and improved process by means of which at the initial stage of the operations, it is now possible to obtain a citric acid solution having such a high degree of purity that he can obtain an almost complete crystallization of the acid from the same, the acid crystals produced being substantially pure, reducing thereby to a considerable extent both the operating as well as the plant costs involved.

In the first of the mentioned processes or the lime citrate process, which features the calcium citrate step, the resulting citric liquors are particularly impure owing to the presence of colloids and of mineral salts which separate out only imperfectly while the citrate is being precipitated; in the second of said processes which features the direct crystallization step, or other similar processes of direct crystallization involving the separation of colloids, the citric liquids are quite impure mainly due to the presence of organic acids other than citric acid, which are either present in the initial juice, or are formed during the alcoholic fermentation, as well as non-fermentable carbohydrates, and inorganic salts originally present which remain in the liquor after the purification from the colloid.

Excepting therefore the mineral salts, which are present in both cases, the impurities are of a different nature in the two cases, thus revealing the limitations of the two processes, each serving to eliminate impurities of a different nature than the impurities eliminated by the other.

These two said processes may for the present purpose be considered complementary to each other, so that if they both are applied to the same liquid, and especially in conditions which are suitable for the elimination of the salts present in solution in both cases, the resulting combined process should produce a liquid which is substantially pure. The purification of the liquid, according to the present invention, may thus be carried out in three different ways as follows:

1. The citric liquid (for example, lemon juice) is subjected to alcoholic fermentation. The colloidal substances are separated out by absorption or by precipitation and the liquid is concentrated to about 200 grams of citric acid per litre. A soluble calcium salt is, eventually, added to increase the calcium ion concentration. This is followed by precipitation with lime in the form of carbonate or hydroxide, which is added until a pH value is reached which is lower than that corresponding both to the isoelectric point of the colloids still present and to the solubility product of the salts present in the solution. In other words, during the operation, the liquor is maintained at such a pH value that although a substantial quantity of citrate is precipitated, the colloid does not seriously coagulate or conglomerate and the dissolved impurities do not precipitate. By operating as above described, a pure citrate salt is obtained by precipitation, which after treatment with sulphuric acid, produces a solution from which it is possible to crystallise out almost the total quantity of the citric acid present, the crystals obtained having a high degree of purity.

2. By effecting the fermentation and purification as described above; thence neutralizing with lime in the form of hydroxide or carbonate, thence adding an organic or mineral acid, so as to reach a pH point as aforesaid. The treatment of the precipitated salt to be effected as described in Case 1.

3. By precipitating the citrate salt as in the known process, subsequently treating the mother liquor with organic or mineral acids in such quantity as to maintain a substantially constant pH value, as already indicated. The remainder of the treatment being the same as that described under 1 and 2.

The following examples (one for each case hereinbefore described) will serve to further illustrate the processes above mentioned.

Case 1.—According to the known method, from a fermented lemon juice, the calcium citrate is precipitated by adding thereto lime in the usual way, either in the form of carbonate or hydroxide. The resulting precipitate is treated with sulphuric acid having a strength of 60° Bé., thus obtaining a citric acid solution from which, after subjecting it to successive and suitable concentration, crystallizes out only a portion of the citric acid contained therein. The crystals obtained are highly colored and impure, and in order to purify them it is necessary to subject them to at least two subsequent re-crystallizations. The mother liquor resulting after the separation of said impure crystals, still containing large quantities of citric acid, is again treated with lime, thus causing precipitation of an additional portion of highly impure calcium citrate, which is also subjected to the subsequent re-crystallization treatment as before. The liquid obtained from the decomposition of this citrate with sulphuric acid, also contains a portion of citric acid which will be transformed into calcium citrate in a third purification, and so on. It will be apparent that said repeated treatments and purifications of the crystals and the complication of the plant required for such operations all tend to materially increase the cost of the process.

Case 2.—According to the known method, a fermented lemon juice is subjected to colloidal flocculation by treating it with an electrolyte, or forming suitable colloids in the solution. The liquor is then filtered, decolorized and concentrated and produces crude crystallized citric acid in variable proportions according to the nature of the juice, varying from 60 to 70% of its total contents. The remaining citric acid left in the solution cannot be crystallized, not because of the presence of colloids in the solution, but on account of organic acids other than citric acid and non-fermentable carbohydrates and of mineral salts and as the solution is not susceptible to further colloidal purification, the remaining citric acid is precipitated in the form of a calcium salt, which is then subjected to subsequent treatment as described under Case 1.

(a) The improved process according to the invention which provides the rapid and economical recovery of practically all the citric acid contained in the orginal solution, is outlined in the following: A fermented lemon juice is first purified from the colloids therein contained, in the manner as explained in Case 2, and then concentrated up to a point depending upon the nature of the juice and its contents of acids, other than citric acid, until the latter averages about 200 grams per liter of solution, then to said solution is added a suitable quantity of calcium chloride, while to said treated solution lime in the form of hydroxide or carbonate is then added in such quantity as to reach a pH value which is barely lower than that corresponding to the isoelectric point of the colloids still present and to the product of solubility of the salts present in solution so as to produce substantially the total precipitation of pure calcium citrate, free from colloids, from mineral or organic acids other than citric acid, etc. The said precipitated calcium citrate after treatment with sulphuric acid, after crystallization liberates almost all the citric acid present in the original juice, in a highly pure state.

(b) An alternative process which may be employed when the juice presents special characteristics, consists in fermenting the juice, purifying it from the suspended colloidal substances in the described manner, neutralizing the juice with lime, adding thereto organic or mineral acids in such a quantity as to restore the pH value to a value barely lower than that corresponding to the isoelectric point of the colloids eventually still present and to the product of solubility of the salts present in solution in said juice, adding thereto some calcium chloride and adding an amount of calcium hydroxide or carbonate which is less than that required to reach the pH corresponding to the isoelectric point at which the colloids are coagulated, thus obtaining a calcium citrate having the same characteristics as in the Case a, and which after treatment with sulphuric acid, liberates by crystallization, almost all the citric acid present in the original juice in a highly pure state.

It is to be noted that in both the processes above described the calcium citrate precipitate obtained from the liquor may with advantage be washed, decanted and filtered in any known manner.

The same process as described for preparation of the citric acid from the citrate of calcium, serves also for the preparation of the citrates of zinc, lead barium and strontium, by correspondingly changing the hydroxide of the carbonate used.

Having now fully described my invention, I claim:

1. The process for manufacturing citric acid from a starting liquid containing the same and impurities in both true and colloidal solutions, which process consists in adding a salt of a metal capable of forming an insoluble citrate up to a total quantity of said salt which is below the quantity required to reach the pH point corresponding to the coagulation and precipitation point of the impurities present, filtering the citrate so obtained and decomposing the same with an acid.

2. The process for manufacturing citric acid from a starting liquid containing the same and impurities in both true and colloidal solutions, which process consists in concentrating the starting liquid, adding a salt of a metal capable of forming an insoluble citrate up to a total quantity of said salt which is below the quantity required to reach the pH point corresponding to the coagulation and precipitation point of the impurities present, filtering the citrate so obtained and decomposing the same with an acid.

3. The process for manufacturing citric acid from a starting liquid containing the same and impurities in both true and colloidal solutions, which process consists in adding to said starting liquid a quantity of colloid having an electric charge of opposite polarity to the colloids in said liquid in order to produce flocculation and thereby obtain a preliminary purification of said starting liquid, concentrating the purified liquid, adding a salt of a metal capable of forming an insoluble citrate up to a total quantity of said salt which is below the quantity required to reach the pH point corresponding to the coagulation and precipitation point of the impurities still present, filtering the citrate so obtained and decomposing the same with an acid.

4. The process for manufacturing citric acid from a starting liquid containing the same and impurities in both true and colloidal solutions, which process consists in adding to said starting liquid a quantity of electrolyte in order to obtain a preliminary purification of said liquid, concentrating the purified liquid, adding a salt of a metal capable of forming an insoluble citrate up to a total quantity of said salt which is below the quantity required to reach the pH point corresponding to the coagulation and precipitation point of the impurities still present, filtering the citrate so obtained and decomposing the same with an acid.

PIETRO LEONE.